United States Patent [19]

Best et al.

[11] 4,439,835

[45] Mar. 27, 1984

[54] APPARATUS FOR AND METHOD OF GENERATION OF RIPPLE CARRY SIGNALS IN CONJUNCTION WITH LOGICAL ADDING CIRCUITRY

[75] Inventors: David W. Best, Marion; Jeffrey D. Russell, Cedar Rapids, both of Iowa

[73] Assignee: Rockwell International Corporation, El Segundo, Calif.

[21] Appl. No.: 283,266

[22] Filed: Jul. 14, 1981

[51] Int. Cl.³ ............................................... G06F 7/50
[52] U.S. Cl. ..................................................... 364/786
[58] Field of Search .............................. 364/786, 785

[56] References Cited

U.S. PATENT DOCUMENTS

| | | | |
|---|---|---|---|
| 3,454,751 | 7/1969 | Brastins et al. | 364/785 X |
| 3,465,133 | 9/1969 | Booher | 364/786 |
| 3,767,906 | 10/1973 | Pryor | 364/786 X |
| 3,843,876 | 10/1974 | Fette et al. | 364/786 |
| 3,932,734 | 1/1976 | Parsons | 364/786 |
| 3,970,833 | 7/1976 | Gehweiler | 364/786 |
| 4,031,379 | 6/1977 | Schwartz | 364/786 |
| 4,052,604 | 10/1977 | Maitland et al. | 364/786 |
| 4,152,775 | 5/1979 | Schwartz | 364/786 |
| 4,323,982 | 4/1982 | Erchrodt et al. | 364/786 |
| 4,363,107 | 12/1982 | Ohhashi et al. | 364/786 |

OTHER PUBLICATIONS

Wade, "Ripple Adder Carry Logic" *IBM Tech. Disclosure Bulletin* vol. 10, No. 11, Apr. 1969, pp. 1638-1639.
Weller, "A High-Speed Carry Circuit for Binary Adders" *IEEE Trans. on Computers* vol. C-18, No. 8, Aug. 1969, pp. 728-732.
Lamdam et al., "A Circuit for High-Speed Carry Propagation in LSI-FET Technology" *The Radio & Electronic Engineer* vol. 46, No. 7, pp. 337-341 Jul. 1976.
Hong, "Ripple Carry Hardware with One-Device Delay Per Stage" *IBM Tech. Disclosure Bulletin* vol. 19, No. 11, Apr. 1977, pp. 4295-4296.

*Primary Examiner*—David H. Malzahn
*Attorney, Agent, or Firm*—Bruce C. Lutz; Howard R. Greenberg; H. Fredrick Hamann

[57] ABSTRACT

A logical AND and logical OR gate are utilized in conjunction with two signals forming bits to be added for ascertaining the value of generate and propagate signals. The generate signal is passed to the output whenever the carry input is a logic zero and the propagate signal is supplied to the output whenever the carry signal is a logic one. This simplification of the approach to generating ripple carry signals substantially reduces the number of transistor to a value of about one-half that utilized in the prior art.

3 Claims, 4 Drawing Figures

APPARATUS FOR AND METHOD OF GENERATION OF RIPPLE CARRY SIGNALS IN CONJUNCTION WITH LOGICAL ADDING CIRCUITRY

INVENTION

The present invention is generally concerned with electronics and more specifically with logic circuitry. Even more specifically, the present invention is concerned with ripple carry circuits utilized in providing full adding circuit functions.

In the prior art, a typical configuration of a ripple carry generator utilized four NAND gates and two inverters and had at least three stages of propagation time delay in providing a ripple carry function.

The present design uses a somewhat different approach to the problem and the final circuit accomplishes the same end result using approximately one-half the transistors and fewer stages of propagation time delay.

It is therefore, an object of the present invention to provide an improved ripple carry generation circuit for utilization in full adder circuits.

Other objects and advantages of the present invention may be ascertained from a reading of the specification and appended claims in conjunction with the drawings wherein:

DETAILED DESCRIPTION

Figures 1, 2, 3, 4:
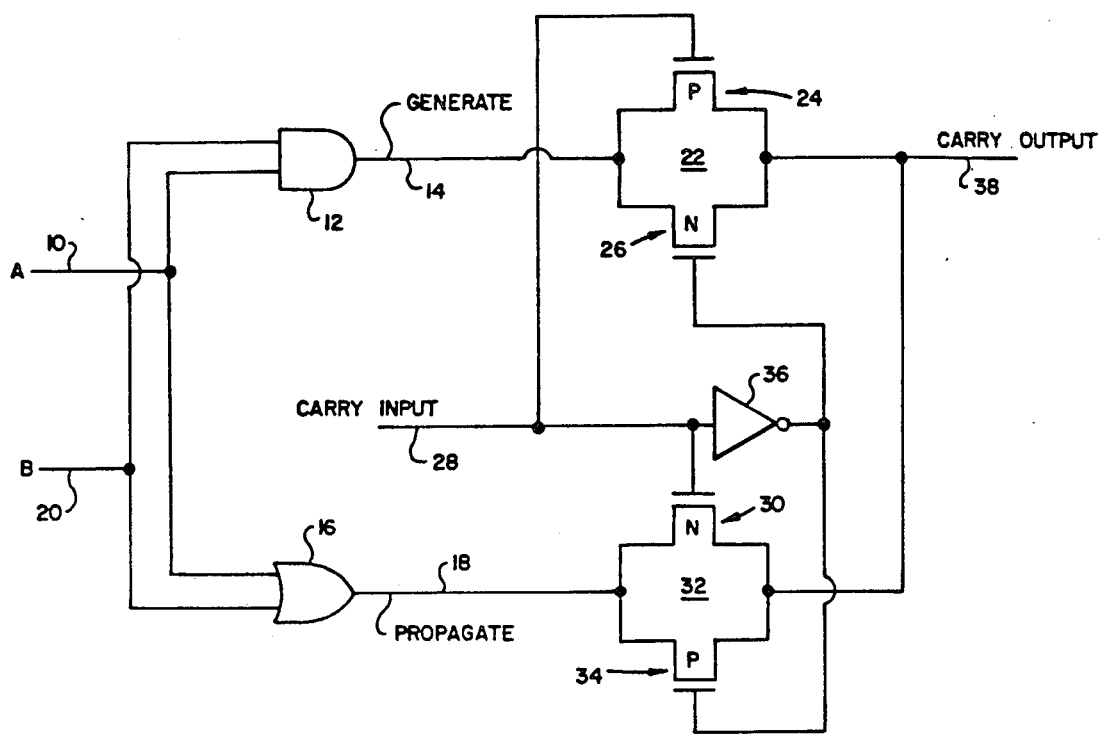
FIG. 1 is a schematic diagram of one embodiment of a ripple carry circuit.
FIG. 2 is a representation of logic values used in explaining the operation of FIG. 1.
FIG. 3 is a table comprising logic values involved in forming a generate signal for use in explaining the operation of FIG. 1.
FIG. 4 is a set of logic values for obtaining the carry out signal utilized in explaining the operation of FIG. 1.

In FIG. 1 an A input lead 10 provides signals to an AND gate 12 used for generating a "generate" signal on an output lead 14 and to an input of an OR gate 16 for propagating a "propagate" output signal on lead 18. A B input 20 provides logic signals to both of the gates 12 and 16. Lead 14 provides signals which are passed through a transmission gate generally designated as 22 having a P channel FET designated as 24 and an N channel FET designated as 26. A carry input lead 28 provides control signals to P channel transistor 24 as well as to an N channel FET transistor 30. N channel transistor 30 is part of a transmission gate 32 also including a P channel FET transistor 34. The carry input signal on lead 28 is inverted by an inverter 36 whose output is connected as a control signal to a gate of N channel transistor 26 as well as to a gate of P channel transistor 34. Signals output by transmission gate 22 are supplied to a carry output lead 38 which provides ripple carry output signals. Transmission gate 32 is connected between lead 18 and output 38.

FIG. 2 illustrates the conditions on propagate lead 18 for various input conditions of signals A and B.

FIG. 3 illustrates the conditions on generate lead 14 for various conditions of the A and B input.

FIG. 4 illustrates the conditions on output lead 38 for various conditions of the propagate and generate signal being a logic one in connection with the alternative logic values appearing on the carry input lead 28.

OPERATION

As previously indicated, the prior art uses a system of truth tables which typically uses a NAND gate to produce a not generate ($\overline{G}$) signal and uses a pair of inverters in conjunction with a NAND gate to produce a not propagate ($\overline{P}$) signal. This $\overline{P}$ signal is often again inverted because both P and $\overline{P}$ signals are required and the same is true for the generate signal. Once the P and G signals have been generated, a carry signal is combined with a P signal and supplied through a NAND gate to a second NAND gate where it is logically combined with a $\overline{G}$ signal to determine whether or not a carry should result.

Such approach to ripple carry typically requires eight to ten transistors after the generation of the $\overline{G}$ and $\overline{P}$ signals.

The present invention produces propagate and generate signals through the use of AND and OR gates 12 and 16 respectively. The propagate signal on lead 18 from the OR gate 16 is illustrated in FIG. 2 where the output is a logic one for all instances except for the instance of both A and B being logic zero. The generate signal appearing on lead 14 occurs only when both inputs are a logic one. The carry signal is then used to activate the two transmission gates 22 and 32. It may be easily ascertained that transmission gate 22 is ON whenever the carry signal is a logic zero while transmission gate 32 is ON whenever the carry signal is a logic one. Looking at FIG. 4, it will be noted that there will be a carry output on lead 38 whenever the propagate signal is a logic one and the carry input is a logic one. Whenever the generate signal is a logic one there will be a carry out regardless of the logic value of the carry input appearing on lead 28. It will be realized that the logic one appearing at the output 38 for the condition of the generate signal being a logic one and the carry signal being a logic one is actually obtained from the OR gate 16. However, this coincides with the intended result as desired by all the prior art circuits. In other words, FIG. 4 is actually the same table as utilized in designing prior art circuits. The present invention is simplified in recognizing that the propagate signal can be used to obtain the desired output result by using an OR gate and associated transmission gate for this one set of logic values where carry in is logic one and generate is also logic one.

As will be observed, if there is no propagate signal there will be no carry signal and if there is a generate signal there will always be a propagate signal. Thus, the logic zero conditions of propagate and generate can be ignored for the purposes of ascertaining whether or not a carry output signal is required.

In summary, it will be observed that the present inventive concept provides a carry out by outputting the logical AND if the carry input is a logic zero and outputting a logical OR of the input signal if the carry signal is a logic one. This then coincides with the desired results illustrated in FIG. 4 for conditions of an output signal with given inputs. The logic zero conditions of propagate and generate may be ignored since there will be no carry if there is no propagate signal.

In view of the above, it will be apparent that other circuit designs may be utilized to accomplish the inventive concept and we thus wish to be limited not by specific embodiment shown but only by the scope of invention as defined by the appended claims, wherein

We claim:

1. Ripple carry signal generating apparatus comprising, in combination:
   first and second logic signal input means for providing first and second logic signals;
   first logical signal combining circuit means connected to said first and second input means for receiving said first and second logic signals therefrom and outputting a logical AND combination signal as a "generate" signal;
   second logical signal combining circuit means connected to said first and second input means for receiving said first and second logic signals therefrom and outputting a logical OR combination signal as a "propagate" signal;
   carry input signal means for supplying carry logic input control signals;
   carry output signal means for providing output signals indicative in logic level of the need to pass carry outputs to further stages of signal combination logic; and
   signal transmission means connected between said first and second logical signal combining circuit means and said carry output means and connected to said carry input signal means for selectively passing propagate and generate signals to said output means in response to control signals from said carry input signal means.

2. The method of generating a carry signal for use in a logical addition function comprising the steps of:
   logically ANDing and ORing two input signals to produce "generate" and "propagate" signals respectively; and
   outputting generate signals when received only when carry signals are of a logical zero value and outputting propagate signals only when the received carry signals are of a logical one value.

3. Apparatus for generating a carry signal for use in a logical addition function comprising, in combination:
   first means for providing a logical AND output generate signal at an output thereof in response to logic signals supplied to first and second inputs thereof;
   second means for providing a logic OR output propagate signal in response to first and second signals supplied to first and second inputs thereof;
   third means, connected to said first and second means, for supplying first and second logical input signals to said first and second input means of each said first and second means;
   fourth means for providing apparatus output signals;
   fifth means for supplying control carry signals of first and second logic values;
   means, connected to said first, fourth and fifth means, for outputting said generate signal from said first means to said apparatus output means of said fourth means when received control carry signals from said fifth means are of a first logical value; and
   means, connected to said second, fourth and fifth means, for outputting said propagate signal from said second means to said apparatus output means of said fourth means in response to received control carry signals from said fifth means when said carry signals are of a second logic value.

* * * * *